United States Patent [19]
Olander, Jr. et al.

[11] Patent Number: 5,997,924
[45] Date of Patent: Dec. 7, 1999

[54] AUTOMATED PROCESS FOR MAKING PIZZA

[75] Inventors: William T. Olander, Jr., Schaumburg; Joseph W. Lucnik, Elk Grove Village; Robert C. Martin, West Chicago, all of Ill.

[73] Assignee: LMO Consultants, Inc., Itasca, Ill.

[21] Appl. No.: 08/795,344

[22] Filed: Feb. 4, 1997

[51] Int. Cl.$^6$ ........................................... A21C 9/08

[52] U.S. Cl. ........................ 426/296; 426/237; 426/243; 426/383; 426/496; 426/518; 99/325; 99/334; 99/352; 99/355; 99/357; 221/135; 221/150 R; 221/150 A; 221/155; 364/479.01; 364/479.02; 364/479.03; 364/479.04; 364/479.11

[58] Field of Search ............................. 26/296, 496, 512, 26/523, 231, 232, 233, 237, 243, 518, 505, 87, 383; 99/357, 325, 334, 352, 355, 450.1; D20/4; 221/135, 150 R, 150 A, 150 HC, 155; 364/479.01, 479.02, 479.03, 478.16, 479.04, 479.11, 479.13

[56] References Cited

U.S. PATENT DOCUMENTS

| | | | |
|---|---|---|---|
| 3,534,676 | 10/1970 | Rubino | 99/355 |
| 4,173,942 | 11/1979 | Plattner | 118/25 |
| 4,197,794 | 4/1980 | Raque et al. | 99/450.1 |
| 4,276,465 | 6/1981 | Flavio | 219/388 |
| 4,716,820 | 1/1988 | Stuck | 99/443 |
| 5,112,630 | 5/1992 | Scott | 426/233 |
| 5,117,749 | 6/1992 | Bakker | 99/450.1 |
| 5,121,677 | 6/1992 | Le Claire et al. | 99/357 |
| 5,147,994 | 9/1992 | Smith et al. | 221/150 HC X |
| 5,210,387 | 5/1993 | Smith et al. | 221/150 A X |
| 5,310,978 | 5/1994 | Smith et al. | 221/150 HC X |
| 5,404,940 | 4/1995 | Smith et al. | 221/150 HC X |
| 5,434,390 | 7/1995 | McKee et al. | 221/150 A X |
| 5,449,888 | 9/1995 | Smith et al. | 221/150 HC X |
| 5,503,300 | 4/1996 | Prescott et al. | 221/150 HC X |
| 5,510,601 | 4/1996 | Smith et al. | 221/150 R X |
| 5,522,310 | 6/1996 | Black, Sr. et al. | 99/357 |
| 5,539,187 | 7/1996 | Smith et al. | 221/150 R X |
| 5,555,793 | 9/1996 | Tocchet et al. | 99/357 X |
| 5,582,758 | 12/1996 | Smith et al. | 221/150 R X |
| 5,685,435 | 11/1997 | Picioccio et al. | 222/2 X |
| 5,688,423 | 11/1997 | Rudewicz | 219/501 |
| 5,772,072 | 6/1998 | Prescott et al. | 221/150 HC X |
| 5,799,822 | 9/1998 | Rudewicz et al. | 221/150 HC |
| 5,921,170 | 7/1999 | Khatchadourian et al. | 99/349 |

*Primary Examiner*—Milton Cano
*Attorney, Agent, or Firm*—D'Ancona & Pflaum LLC

[57] ABSTRACT

An automated self-service pizza process and system comprises a vending machine with self-contained cooking and processing equipment to rapidly prepare delicious pizza. The stand-alone unattended process and system visually displays pizzas with choices of different toppings for selection by a customer who can pay for the pizza by credit card, debit card, prepaid card, bank card, or by paper money or other cash. Pizza crust can be moved to an assembly area by a robot. In the assembly area, the selected toppings are automatically dispensed on the pizza crust. The pizza is then conveyed to an oven where it is cooked and discharged into a cardboard box or other suitable container. The type of pizza and customer's name can be printed on the box with an ink jet printer.

26 Claims, 2 Drawing Sheets

AUTOMATED PROCESS FOR MAKING PIZZA

BACKGROUND OF THE INVENTION

This invention pertains to pizza and, more particularly, to an automatic process and system for producing pizza.

Pizza is a very popular food in the United States and elsewhere. Pizzas are typically individually prepared and sold in pizza restaurants or pizzerias. Making pizzas is very labor intensive. In larger pizza restaurants, one person kneads, rolls, twirls, spins and cuts the dough to prepare pizza crust. Another person grates the cheese, slices the sausage or pepperoni and other pizza toppings, and individually places the toppings on the pizza with their fingers. The pizza is carried to the cook who places the pizza in the oven with a shovel or giant spatula. After the pizza is completely cooked in the oven, the pizza is removed by the cook with the shovel or spatula and manually sliced with a knife or a pizza cutter comprising a circular blade or table disc with a sharp edge. The sliced pizza is then manually placed on a plate or in a cardboard box for carry-out. A waiter or waiters will carry the pizza to the customer. The customer typically pays for the pizza at a cashier.

The number of people associated with making pizza in restaurants greatly increases the costs of the pizza. Labor costs associated with preparing and delivering pizzas include: wages, medical benefits, vacation benefits, holiday pay, sick pay, health insurance, automobile insurance for deliveries, and workmen compensation claims. Other labor costs include the costs and time for hiring and training new personnel.

While pizza restaurants are very popular, they are often placed in remote locations, which are not readily accessible or close to offices, college dormitories, schools, motels, hotels, etc. Furthermore, because the employees of pizza restaurants usually work 8–10 hours per day, pizza restaurants are only open for limited times, i.e., 8–10 hours per day. Many pizza restaurants are only open 5 to 6 days per week. Students and guests at motels who get hungry for pizza late at night are usually unable to satisfactorily obtain a pizza at nearby locations.

Pre-made frozen pizzas are available, but they have to be stored in a freezer and subsequently thawed and cooked in a microwave oven or a kitchen oven. Freezers and ovens are not always available to students, motel guests, office workers, etc. Furthermore, many customers do not care for the taste of frozen pizza and prefer freshly made pizza.

It is, therefore, desirable to provide an improved process and system for preparing and providing pizza, which overcomes most, if not all, of the preceding problems.

SUMMARY OF THE INVENTION

An improved automated pizza process and system is disclosed to readily prepare and rapidly provide pizza for take-out, as well as for the workplace, college campuses, military bases, hotels, motels, and elsewhere. The economical PIZZAMAT process and system is preferably a stand-alone unattended automated pizza making and cooking machine and process. Desirably, the entire assembly and cooking process can be viewed by the customer for its entertainment value. The primary market of the PIZZAMAT process and system is unattended self-serve take-out pizza stores, as well as vending machine installations where customers would desire quick pizza delivery, such as hotels, motels, and dormitories. Advantageously, the user friendly automated pizza process and system is speedy, fun and attractive. The reliable automated pizza process and system is also simple-to-use, efficient and effective.

The automatic pizza process can include a vending machine in which pizza is identified, paid for, cooked and retrieved. The pizza can be identified by electronically displaying an illustration of at least part of the pizza and by viewing different ingredients (toppings) on the pizza. After the desired pizza and ingredients are selected (chosen) by the customer, the pizza can be paid for inserting paper money, such as dollar bills into the vending machine. Alternatively, the pizza can be paid for by inserting a plastic credit card, ATM bank card, debit card or prepaid card into an optical or electrical card reader, which is operatively associated with the vending machine. The information on the card can be verified and transmitted to a processing center, such as a credit card company, bank, or other financial institution, by a modem connected to the card reader.

The pizza crust can be robotically moved to an assembly area and/or can be moved, slid or rotated by an indexing table. In the assembly area, the customer can view one or more toppings, as selected, being automatically dispensed on the pizza crust, such as by cartridge tubes. The assembled pizza can be conveyed to a pizza oven where the pizza is cooked. The cooked pizza can be cut, dispensed and/or packaged in a cardboard box, carton, disposable plate, etc. for transport, (carrying) or take-out by the customer to the desired eating area.

A more detailed explanation of the invention is provided in the following description and appended claims taken in conjunction with the accompanying drawings.

DETAILED DESCRIPTION OF THE PREFERRED EMBODIMENTS

Figure 1:
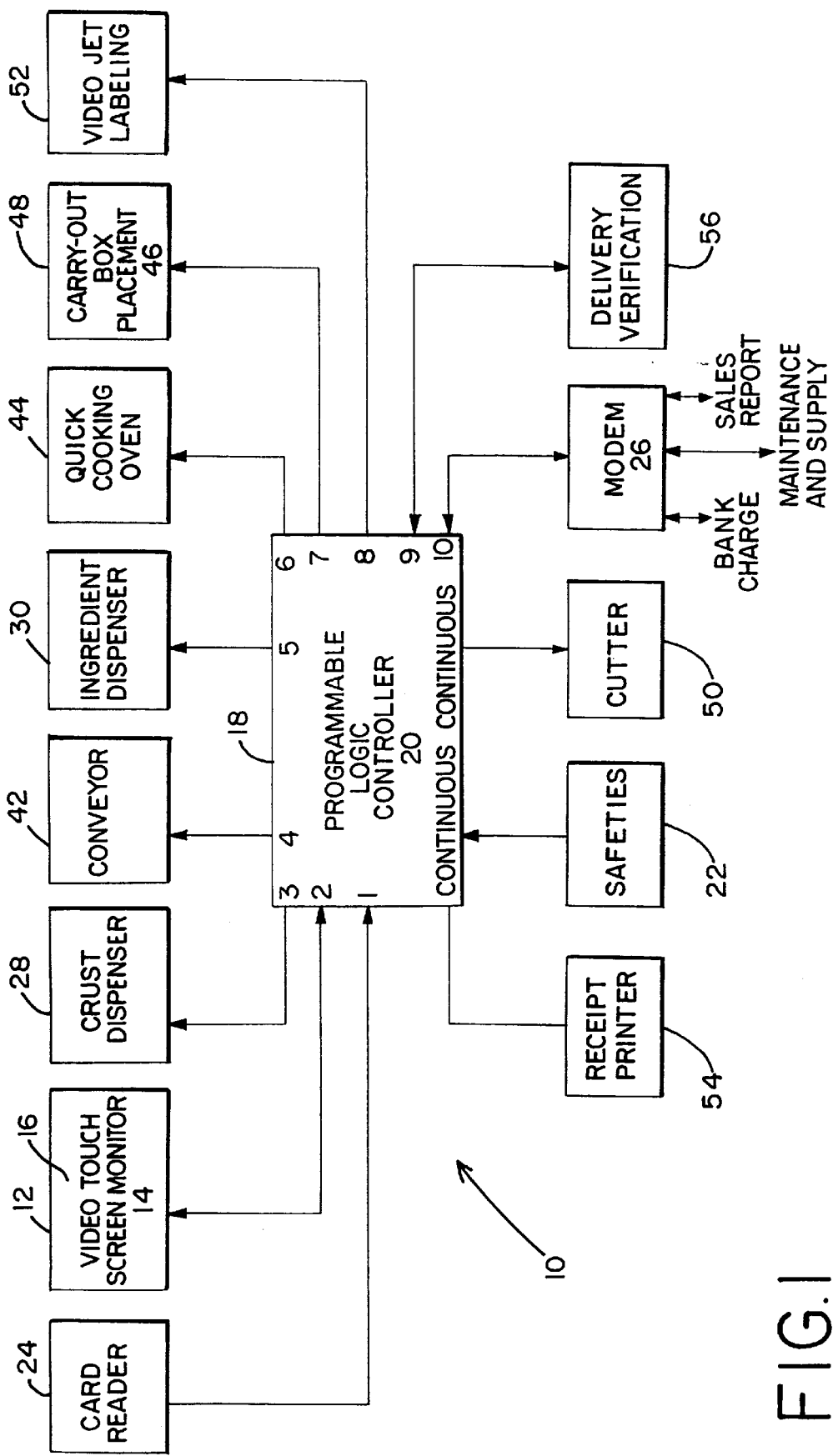
FIG. 1 is a logic flow diagram of an automated pizza process and system in accordance with principles of the present invention.

An automated pizza process and system 10 (FIG. 1), which is also referred to as a PIZZAMAT, provides a stand alone, self-contained, automatic, self-service, unattended, pizza making apparatus, cooking equipment, vending machine and method to quickly prepare, efficiently cook and speedily dispense, delicious low costs pizza for customers of all ages. The pizza process and system can be fully automatic without normally requiring personnel to operate the process and equipment. Furthermore, the labor-saving, economical pizza process and system does not require the physical presence of personnel to interface with customers to take orders and receive and collect payment for pizzas produced by the process and system.

Service with a smile can be accomplished by the pizza process and system with a monitor 12 (FIG. 1) which visually and electronically displays colored representations of various size pizzas, different pizza toppings (ingredients) and their prices. The monitor provides a person-to-machine interface which displays the pizza sizes and topping choices and allows the customer to build and select the desired pizza and toppings at the indicated prices. While the monitor can be a cathode ray tube (CRT), it is preferred that the monitor comprise a flat panel liquid crystal display, active matrix or passive matrix, for compactness, less weight and smaller size. Preferably, the monitor comprises a touch screen 14 with colored pixels for full color display of the pizzas and their toppings. The touch screen can have scrolling or sequential printed instructions. The colored monitor can also be equipped with sound and amplification equipment, such as a transmitter and speaker and associated circuitry, to electronically speak and transmit the instructions and selections to customers.

The touch screen can have pressure-sensitive or heat-sensitive sensors 16 (FIG. 1) which provide controls to detect and sense a finger of a customer selecting the desired pizza, toppings and price. The sensors are activated by manual engagement of the customer's finger to generate electrical impulses. The sturdy, lightweight, heavy duty, rugged, flat panel display can be connected to analog or digital circuitry, and helps provide protection from dust, particulates, moisture, and minor vandalism. A touch screen display can provide reliability and flexibility without the need for push buttons, pull knobs, and levers. A heavy duty, flat panel display (FPD) with a NEMA 4/12 (IP-65) rating is available from Contec Microelectronics USA Inc. of San Jose, Calif. After the customer has completed and acknowledged a selection, assembly and preparation of the selected pizza commence. The monitor can also display the status of the pizza as it is being assembled, prepared and cooked.

A central processing unit (CPU) 18 (FIG. 1) is connected to the monitor to receive and transmit electrical impulses. The central processing unit can be: a microprocessor, computer, electronic chip, control board, logic controller, or preferably a programmable controller (PLC) 20, such as a FXon brand Micro-PLC produced by Mitsubishi. The PLC coordinates the flat panel touch screen display of the monitor, along with a card reader and modem, as well as other sensors and control system. The PLC can be both programmable and expandable to accommodate desired changes and variations for a specific location or group of customers. The PLC can control and monitor the described automatic functions for pizza production. The PLC can have: and analog I/O for temperature monitoring and control, a digital I/O for the described automatic functions, and a data I/O for the flat panel touch screen display and modem interface. The PLC is the brains of the system and process and can monitor all process steps including ordering, preparing, cooking, packaging, and delivery of the pizza. The PLC also coordinates with safety check circuitry 22 to provide safety checks for the components and operations of the system for safeguards, specification requirements, and regulatory compliance.

Payment and collection equipment are connected to the CPU and monitor. If it is desired to collect paper money, an appropriate paper money collection device, such as a dollar bill collection mechanism, can be installed with a change or coin return button. Preferably, a credit card reader 24 (FIG. 1) is used to receive and read a customer's plastic card, such as a: credit card, debit card, automatic teller machine (ATM) bank card, or prepaid cash card. A modem 26 is connected to the credit card reader and PLC, to verify and transmit information about the customer's card via a phone line to a remote processing center. The amount to be debited is determined by the customer's selection from the touch screen. The modem can be used for card verification as well as for system error reporting and troubleshooting. Should a malfunction or error occur, e.g. an ingredient omitted, incorrect temperature, safety shutdown, or damage due to tampering or vandalism, the modem can call a pre-programmed telephone number to send an alarm and report this mishap and information. The modem can also function as a pager and receiver to retrieve information about sales, system, status, inventory control, as well as to implement price changes, promotions, and software modifications of the text and/or graphics displayed on the screen of the monitor. One type of modem that can be used is the AND-1 brand modem available from Western Telematic Inc. of Irvine, Calif. After the customer's card is verified and the customer's account is debited, the pizza assembly and preparation steps begin.

Upon ordering, selection and payment, a pizza crust is dispensed, transported and moved into the assembly area by a transporter 28 (FIG. 1) or transport mechanism, providing a crust dispenser. The pizza crust can be pre-made, or rolled and cut on site from pre-made dough, or mixed and formed from various scratch ingredients. The transporter can comprise an indexing table with an x-y axis or x-y translator to slide and/or rotate the pizza crust. The transporter can also include a mobile robot with a mechanical robotic arm to carry the pizza crust. The robot arm can have 4 degrees of freedom and a functional gripper for 5 axis. The robot can reach a length of 16.5" or more when reaching forward. The gripper hand of the robot can open to a maximum of 1" or more. Depending on the controller used, the robot arm can rotate up to 180 degrees on the base. The accuracy of the robot arm is 0.36 degrees or 255 steps for about 90 degrees or 0.72 degrees or 255 steps per 180 degrees. A 5 axis closed loop robot and robotic arm is available from Lynxmotion of Pekin, Ill.

Figure 2:
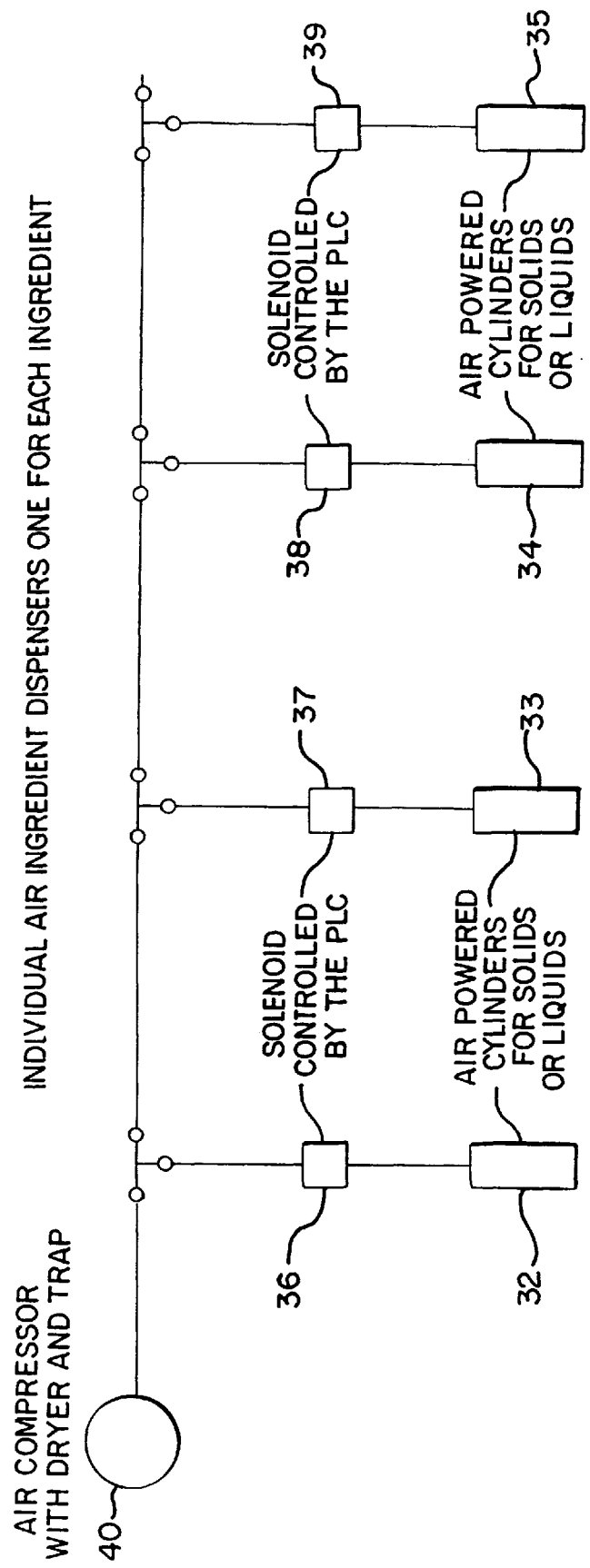
FIG. 2 is a pneumatic flow diagram of the pizza topping (ingredient) dispensers of the automated pizza process and system.

In the assembly area, the toppings are automatically dispensed and injected on the pizza curst. The toppings are preferably stored in transparent cartridge tubes 30 (FIG. 1), which are positioned above the pizza crust in the assembly area (station) to enhance dispensing of toppings and promote sanitation, ease of handling and replacement. The cartridge tubes provide pneumatic ingredient dispensers. Each of the tubes contain a different topping. As shown in FIG. 2, the cartridges can be sequentially dispensed and emptied by air-powered pneumatic reciprocating cylinders 32–35 which are regulated and controlled by solenoids 36–39 or solenoid valves connected to the PLC. An air compressor 40 with a dryer and trap can provide the necessary pneumatic pressure to raise and lower the cylinders at the desired speed. The toppings (ingredients) are dispensed, injected and placed on the crust in a selected pattern, array or matrix, as programmed or preset by the PLC. The touch screen and PLC can also be programmed to permit the customer to select special topping patterns, e.g., numbers, names, symbols, pictures, for birthdays or other special occasions.

Once the pizza has been assembled with the selected toppings, a conveyor 42 (FIG. 1) will convey the pizza from the assembly area through a pizza oven 44 to a packaging and dispensing area. The pizza oven can comprise: a wave oven, an electrically heated ovenchamber or open ended pizza oven which can cook the pizza in less than five minutes. The wave oven can have 12 high wattage halogen lamps for use with a 40 amp, 240 volt circuit. A preferred wave oven is available from Amana Appliances of Amana, Iowa. One type of pizza oven is available under the brand name of PIZZA PAL from Wisco Industries, Inc. of the U.S. Other types of pizza ovens are available from Roto Oven in Abbotsford, British Columbia, Canada and from Comstock Castle Stove Company in the U.S.

The cooked pizza can be discharged, dispensed, conveyed and placed on a pizza support member 46 (FIG. 1) such as a carton, container, package, plastic plate, paper plate, or preferably a cardboard pizza box in a packaging or boxing area. The cardboard pizza box provides a carry-out box. Boxes can be preformed and folded, or can be assembled and placed, by boxing or carton assembling equipment 48. The cardboard box can be stacked on a spring-loaded dispensing table or platform. The pizza can be automatically cut and sliced with an overhead cutting tool 50 such as a robotically controlled circular cutting disc, pizza blade, cutter or knife. After the pizza is cut, the box can be robotically closed or mechanically closed by box closing equipment.

A printer 52 (FIG. 1), such as an ink jet printer or video jet labeling printer, is connected to the PLC to print information on the pizza box, such as the customer's name, type of pizza, list of toppings, etc. A receipt or sheet with the customer's credit card information can also be attached or printed on the box by the printer or a separate receipt printer 54. If desired, the preceding information can be printed on a label and the label bonded, glued, or otherwise secured to the box, such as with labeling equipment. The printed box containing the sliced cooked pizza is then conveyed, discharged and dispensed to a retrieving station and area where the customer can pickup and retrieve the pizza. For additional security and to avoid a customer mistakenly picking up the wrong pizza, i.e., someone else's pizza, it is preferred that the customer be required to reinsert the customer card into the card reader or an auxiliary card reader to convey and dispense the correct box to the customer at the retrieving station and/or unlock and open the access door to the customer-retrieving area.

In operation, the customer can order a pizza by making a pizza selection on the color touch screen. Once the selection has been made, a total dollar amount will be displayed. Pictorial representations of different pizzas, their ingredients and their prices are electronically and visually displayed on the touch screen providing the flat panel display of the monitor. The ingredients can comprise condiments providing pizza toppings, such as: tomato sauce, cheese, sausage, pepperoni, onion, green peppers, anchovies, mushrooms, ground beef, olives, pepper and other spices. The pizza size and toppings can be selected by pressing the customer's finger(s) against the pressure-sensitive touch sensors or heatsensitive touch sensors on the touch screen corresponding to the pictorial representations (illustrations) of desired pizza size and toppings. If the customer is satisfied with the customer's selection (choice) of pizza, toppings and price, the customer's method of payment will be inserted into the PizzaMat vending machine and debited. The customer can insert a credit card, ATM card, debit card, or prepaid cash card into the card reader in order to complete the order and pay for the selected pizza. Information from the credit card including the name and identification number of the card holder (purchase) and purchase price is transmitted from the card reader via the modem to a financial institution (bank or credit card company) for verification and debiting. The card can also be used later to retrieve the pizza. For cash payments made to dollar bill collectors connected to the CPU, the customer may be asked to enter their name. A receipt attached or printed on the box, will show the type of pizza ordered, the toppings, method of payment, and the total purchase price.

After the pizza is ordered, a proper size pizza crust will be dispensed and transported to a pizza assembly area. An indexing table can be provided to slide and rotate the pizza crust in the assembly area. The pizza crust can also be carried to the assembly area by a mechanical arm of the robot. In the assembly area, the selected pizza toppings are automatically dispensed and pneumatically injected on the pizza crust by the pneumatically operated overhead cartridge tubes. The toppings and crust can be stored and assembled at refrigerated temperatures.

The assembled pizza comprising the pizza crust with the selected toppings are conveyed to the pizza oven, where the pizza is electrically cooked for a predetermined amount of time, preferably less than five minutes. After the pizza is cooked, the pizza is conveyed, charged and dispensed into a box with the customer's name (identification) and type of pizza printed on the box. The pizza can then be automatically cut into slices with an automatic overhead cutting tool and the box is mechanically closed. The closed box is then conveyed and dispensed into the retrieving area. The customer's card or a receipt card can be inserted into a card reader to retrieve and permit access to the boxed cooked pizza.

The housing or walls of the PIZZAMAT vending machine can have windows or view ports made of transparent glass or transparent impact-resistant plastic. The windows allow the customer to view assembly, conveying, cooking, cutting, boxing and dispensing of the pizza so as to entertain the customer while waiting for the pizza. Numerous pizzas can be sequentially processed at the same time.

As described above, the PIZZAMAT system is a fully automated pizza making facility. Its typical location can be a strip shopping center. The reason to go there would be to purchase a carryout pizza that is ordered and entered by the purchaser who is then entertained by the machine while the pizza is made. The PIZZAMAT II vending machine is a fully automated pizza making machine which is typically located in vending areas, factory break rooms, office lunchrooms, hotels, motels, and arcades. With minimal waiting time, the pizza can be ordered and entered by the customer who is entertained by the machine while the pizza is made. The PIZZAMAT II vending machine can also serve as a profit center by the installer rather than the purchaser buying from a remote provider. The PIZZAMAT system and vending machine can be open and operational 24 hours a day, 7 days a week.

If the preferred process, the purchaser (customer) inserts a credit card or PIZZAMAT debit card into the card reader. After the card is registered the purchaser selects the pizza ingredients (toppings) using the touch screen display with pictorial illustrations of the pizza and ingredients. The amount of sale can then be authorized by phone line via the modem, at the appropriate company. The purchaser will be prompted to verify the purchase. The purchaser can enter the sale and the pizza making process will begin.

The proper sized pizza crust will then move into the assembly area using an indexing table and/or a robotic arm. The ingredients are then placed on the pizza crust in a programmed pattern. The coordinates of the ingredients are programmed into the programmable controller (PLC). The whole process can be viewed through a clear glass viewing area to provide entertaining for customers, their children and young people. The PLC is the brains of the machine and can monitor all process steps and procedure in the automated process including ordering, preparing, cooking, packaging, delivery, and safety check. The PLC can be connected via a phone line to a central computer where the process can be altered, corrected, modified or terminated.

A conveyor moves the pizza into an electric cooking oven or other pizza oven where the pizza is cooked. The conveyor then delivers the pizza into a box, which the customer removes. The pizza box can have the customer's credit card information printed on its. The process is completed upon removal of the box containing the cooked pizza and delivery verification 56 (FIG. 1).

Among the many advantages of the PIZZAMAT automated pizza process and system are:

1. Outstanding performance
2. Superb pizzas
3. Lower production costs
4. Attractive
5. Decreased labor costs
6. Fewer employee-benefit costs
7. Less insurance and overhead expenses
8. Greater throughput
9. Open 24 hours a day
10. Good amusement value
11. Excellent entertainment
12. Reliable
13. Safe
14. Economical
15. Efficient
16. Effective
17. User-friendly Although embodiments of this invention have been shown and described, it is to be understood that various modifications and substitutions of equipment, parts, components, and process steps can be made by those skilled in the art without departing from the novel spirit and scope of this invention.

What is claimed is:

1. An automated pizza process for making a pizza using an automated pizza system, the automated pizza process comprising the steps of:

electronically displaying representations of different pizzas, pizza crust sizes, pizza toppings and pizza prices on a monitor for viewing and selecting, said toppings selected from the group consisting of tomato sauce, cheese, sausage, pepperoni, anchovies, onion, green pepper, mushrooms, ground beef, olives, and spices;

selecting a pizza by engaging a plurality of controls operatively associated with said monitor, said controls corresponding to the representation of a desired pizza crust size and said pizza toppings, said controls being selected from the group consisting of a touch screen display on said monitor or a push button connected to said monitor;

inserting a card into a card reader to order and pay for said selected pizza, said card being selected from the group consisting of a credit card, a debit card, and an automatic teller machine card, said card reader being operatively connected to said control and said monitor;

selecting a pizza crust size and selecting pizza topping choices;

dispensing said selected pizza toppings via a plurality of cartridge tube dispensers containing pizza toppings;

transporting said pizza crust within the automated pizza system via a robot, said robot having at least four degrees of freedom, said robot further being operatively associated with said plurality of cartridge tube dispensers thus providing means for dispensing pizza toppings;

building said pizza according to said selected pizza crust size and said selected topping choices;

cooking said pizza;

discharging and dispensing said cooked pizza from said oven onto a pizza support member selected from the group consisting of a cardboard box, carton, container, package, pepper plate and plastic plate;

automatically cutting the pizza into slices with a cutting tool; and permitting a consumer to access said sliced cooked pizza on said pizza support member.

2. An automated pizza process in accordance with claim 1 wherein said cooked pizza is dispensed into a cardboard box; and
   said box is mechanically closed after said cooked pizza has been automatically cut into slices.

3. An automated pizza process in accordance with claim 2 including:

printing the customer's name and type and toppings for said pizza on an identification label; and
   securing said identification label on said box.

4. An automated pizza process in accordance with claim 2 including printing the customer's name on said box.

5. An automated pizza process in accordance with claim 1 wherein said sliced cooked pizza is dispensed from a vending machine.

6. An automated pizza process in accordance with claim 1 wherein said pizza is electrically cooked in an electric pizza oven.

7. An automated pizza process in accordance with claim 1 wherein said sliced cooked pizza is accessed by thereafter inserting said card into said card reader and retrieving said pizza.

8. An automated pizza process in accordance with claim 1 wherein said steps of displaying, selecting, initiating a plurality of cartridge tube dispensers, initiating a robot, building, and cooking are controlled by a central processing unit selected from the group consisting of:

a programmable controller, microprocessor, computer electronic chip, control board, and logic controller.

9. An automated pizza process in accordance with claim 1 including viewing said building of said pizza through windows comprising transparent glass or plastic.

10. An automated pizza system, comprising:

a touch screen providing a monitor for displaying a representation of a pizza, different pizza crust sizes, pizza toppings, and pizza prices, said touch screen having sensors for detecting a finger of a customer selecting the desired pizza crust size and pizza toppings, said sensors being activated by manual engagement of the customer's finger to generate electrical impulses;

a central processing unit operatively connected to said monitor for receiving and transmitting said electrical impulses, said central processing unit being selected from the group consisting of a programmable controller, microprocessor, computer, electronic chip, control board, and logic controller;

a credit card reader operatively connected to said monitor and said central processing unit for receiving and reading a customer card selected from the group consisting of a credit card, debit card, and automatic teller machine card;

a modem operatively connected to said credit card reader for verifying and transmitting information about said customer card to a remote processing center;

a plurality of cartridge tube dispensers operatively associated with said automated pizza system, said cartridge tube dispensers providing means to dispense pizza toppings, said cartridge tube dispensers containing pizza toppings;

a robot operatively associated with said automated pizza system, said robot having at least four degrees of freedom, said robot providing transport of said pizza crust within said automated pizza system, said robot further being operatively associated with said plurality of cartridge tube dispensers, a pizza oven for cooking said pizza; and said robot, cartridge tubes, and pizza oven cooperating with each other to prepare and cook the selected pizza.

11. An automated pizza system in accordance with claim 10 including an ink jet printer operatively associated with said central processing unit for printing the customer's name and type of pizza on a cardboard box containing the cooked pizza.

12. An automated pizza system in accordance with claim 10 wherein said automated pizza system comprises a vending machine.

13. An automated pizza system in accordance with claim 10 including transparent glass or transparent plastic for viewing said pizza oven, robot and cartridge tubes.

14. A process for making a pizza using an automated pizza system, the process comprising the steps of:

interacting with a monitor operatively associated with the automated pizza system to start the automated pizza system, said monitor providing a person-to-machine interface, said monitor including access to operating instructions for the automated pizza system, said monitor further including access to a plurality of descriptions of pizza crust sizes and topping choices, said monitor further including access to a display of the status of a pizza made by the automated pizza system;

selecting the pizza crust size by further interacting with said monitor;

selecting the topping choices by further interacting with said monitor;

dispensing said selected pizza toppings via a plurality of cartridge tube dispensers containing pizza toppings;

transporting said pizza crust within said automated pizza system via a robot, said robot having at least four degrees of freedom, said robot further being operatively associated with said plurality of cartridge tube dispensers thus providing means for dispensing pizza toppings;

building said pizza according to said selected pizza crust size and said selected topping choices;

cooking said pizza.

15. The process of claim 14 further including a step of vending said pizza.

16. The process of claim 15 wherein the step of vending said pizza includes a step of paying for said pizza.

17. The process of claim 16 wherein the step of paying for said pizza includes:

inserting a plastic credit card, automatic teller machine card, debit card, or prepaid card, into an optical or electrical card reader operatively associated with said vending machine; and verifying and transmitting information on said card by a modem to a processing center.

18. The process of claim 16 wherein the step of paying for said pizza includes inserting paper money into the automated pizza system.

19. The process of claim 14 further including the step of packaging said pizza.

20. The process of claim 19 wherein the step of packaging said pizza includes placing said pizza in a box.

21. The process of claim 19 wherein the step of packaging said pizza includes labeling the package with a customer's information.

22. The process of claim 14 further including a step of retrieving said pizza from said automated pizza system.

23. The process of claim 22 wherein the step of retrieving said pizza from said automated pizza system includes inserting a credit card into said automated pizza system.

24. The process of claim 14 wherein said monitor further includes access to a plurality of descriptions of pizza topping patterns.

25. The process of claim 24 further including the step of selecting a pizza topping pattern by further interacting with said monitor.

26. The process of claim 25 wherein said robot is operatively associated with said plurality of cartridge dispensers such that said pizza toppings are dispensed according to said selected pizza topping pattern.

* * * * *